(12) United States Patent
Ogawa et al.

(10) Patent No.: US 9,974,112 B2
(45) Date of Patent: May 15, 2018

(54) WIRELESS COMMUNICATION APPARATUS AND WIRELESS COMMUNICATION METHOD

(71) Applicant: SEIKO EPSON CORPORATION, Tokyo (JP)

(72) Inventors: Yohei Ogawa, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/426,441

(22) Filed: Feb. 7, 2017

(65) Prior Publication Data

US 2017/0265236 A1    Sep. 14, 2017

(30) Foreign Application Priority Data

Mar. 8, 2016 (JP) .................................. 2016-044124
Dec. 26, 2016 (JP) .................................. 2016-250618

(51) Int. Cl.
*H04W 48/16* (2009.01)
*H04W 76/02* (2009.01)
*H04W 76/04* (2009.01)
*H04W 84/12* (2009.01)
*H04W 88/06* (2009.01)

(52) U.S. Cl.
CPC ........... *H04W 76/14* (2018.02); *H04W 48/16* (2013.01); *H04W 76/023* (2013.01); *H04W 76/045* (2013.01); *H04W 76/25* (2018.02); *H04W 84/12* (2013.01); *H04W 88/06* (2013.01)

(58) Field of Classification Search
CPC ..................................................... H04W 48/16
See application file for complete search history.

(56) References Cited

U.S. PATENT DOCUMENTS

| | | | | |
|---|---|---|---|---|
| 7,561,582 B2 * | 7/2009 | Ohta | ..................... | H04J 3/0632 370/324 |
| 2009/0098869 A1 * | 4/2009 | Torrance | ............... | H04W 48/16 455/426.1 |
| 2014/0320908 A1 | 10/2014 | Iwauchi et al. | | |
| 2014/0320909 A1 | 10/2014 | Shimazaki | | |
| 2016/0066252 A1 * | 3/2016 | Parron | .................. | H04W 48/16 455/434 |

FOREIGN PATENT DOCUMENTS

| | | |
|---|---|---|
| EP | 2942993 A1 | 11/2015 |
| JP | 2014-225861 A | 12/2014 |

OTHER PUBLICATIONS

The Extended European Search Report for the corresponding European Patent Application No. 17159737.0 dated Nov. 9, 2017.

* cited by examiner

*Primary Examiner* — Hsin-Chun Liao (57) ABSTRACT

A wireless communication apparatus includes an indirect wireless communication unit that performs wireless communication that involves an access point; a direct wireless communication unit that performs direct wireless communication that does not involve the access point; a control unit that controls a search for the access point that is performed by the indirect wireless communication unit, in which the control unit controls a timing at which the indirect wireless communication unit searches for the access point, according to a communication state of the direct wireless communication.

9 Claims, 10 Drawing Sheets

WIRELESS COMMUNICATION APPARATUS AND WIRELESS COMMUNICATION METHOD

BACKGROUND

1. Technical Field

The present invention relates to a wireless communication apparatus and a wireless communication method.

2. Related Art

In the related art, a device is known that is equipped with an infrastructure mode in which wireless connections are made to communication terminals with an external access point serving as a relay station, and Wi-Fi (a registered trademark) Direct mode (hereinafter referred to as "direct wireless connection mode") in which the communication terminals perform peer-to-peer direct wireless connection without involving an access point. For example, a communication apparatus that is able to operate in the infrastructure mode and the direct wireless connection mode at the same time is disclosed in JP-A-2014-225861.

Incidentally, despite the fact that a configuration for making a connection to an external access point is employed, for example, because the external access point is outside of a range of possible communication, is powered off, and so forth, in a case where an access point is not connected to a wireless communication apparatus, the wireless communication apparatus performs a search for the access point in order to make a connection to a configuration-finished access point. When searching for the access point, a wireless LAN adapter performs dynamic scan that sequentially transmits probe requests over all channels while changing the channels one by one. At this point, if, over one channel, the wireless LAN adapter can perform communication at the same time, when the access point is searched for in a state where a connection is made to a wireless communication terminal in the direct wireless connection mode using a certain channel, because the dynamic scan uses one channel, the communication with the wireless communication terminal in the direct wireless connection mode stops. Therefore, for example, in a case where a printer as the wireless communication apparatus receives printing data from a smart device as the wireless communication terminal that is connected in the direct wireless connection mode, because the printer searches for (performs the dynamic scan on) the access point, in some cases, a delay occurs in completing communication of the printing data, or data communication is interrupted.

SUMMARY

An advantage of some aspects of the invention is that a technology which can perform data communication through direct wireless connection in a more suitable manner is provided.

(1) According to an aspect of the invention, there is provided a wireless communication apparatus for accomplishing the object, including: an indirect wireless communication unit that performs wireless communication that involves an access point; a direct wireless communication unit that performs direct wireless communication that does not involve the access point; a control unit that controls a search for the access point that is performed by the indirect wireless communication unit, in which the control unit control a timing at which the indirect wireless communication unit searches for the access point, according to a communication state of the direct wireless communication.

According to the aspect of the invention, because the search for the access point is performed at a timing in accordance with the communication state of the direct wireless communication, an influence that the search for the access point exerts on the data communication through the direct wireless connection can be reduced, and the data communication through the direct wireless connection can be suitably performed.

(2) In the wireless communication device, the control unit may change a periodic length that is an interval at which the access point is periodically searched for, according to the communication state of the direct wireless communication.

When this constitution is employed, for example, in a case where the direct wireless communication is performed that does not involve the access point, the periodicity length for the search is changed in such a manner that it is longer, and thus the influence that the search for the access point exerts on the data communication through the direct wireless connection can be reduced.

(3) In the wireless communication apparatus, the control unit may select whether or not the access point is searched for, according to the communication state of the direct wireless communication.

By employing this constitution, the influence that the search for the access point exerts on the data communication through the direct wireless connection can be reduced not by searching for the access point in a case where communication for the direct wireless communication is performed and by performing the search for the access point in a case where the communication for the direct wireless communication is not performed.

(4) In the wireless communication apparatus, the control unit may change a timing at which the access point is searched for, according to an amount of communication in the direct wireless communication.

By employing this constitution, according to the amount of communication in the direct wireless communication, the influence that the search for the access point exerts on the data communication through the direct wireless connection can be efficiently reduced.

(5) In the wireless communication apparatus, the control unit may change the timing at which the access point is searched for, according to the number of terminals that are connected through the direct wireless communication.

By employing this constitution, according to the number of terminals that make connections through the direct wireless communication, the influence that the search for the access point exerts on the data communication through the direct wireless connection can be efficiently reduced.

(6) In the wireless communication apparatus, when wireless connection to the access point is configured, but the wireless connection to the access point is not made, the control unit may cause the indirect wireless communication unit to search for the access point.

By employing this constitution, due to the search for the access point, which is performed when the wireless connection to the access point is configured, but the wireless connection to the access point is not made, the influence that is exerted on the data communication through the direct wireless connection can be reduced.

(7) In the wireless communication apparatus, the indirect wireless communication unit and the direct wireless communication may share an antenna that is used for wireless communication.

By employing this constitution, due to the search for the access point for the indirect wireless communication between the direct wireless communication and the indirect wireless communication that share the antenna, an influence can be reduced that is exerted on the data communication through the direct wireless connection.

(8) According to another aspect of the invention, there is provided a wireless communication method for use in a wireless communication apparatus including an indirect wireless communication unit that performs wireless communication that involves an access point and a direct wireless communication unit that performs direct wireless communication that does not involve the access point, which is for accomplishing the object, the method including controlling a timing at which the access point is searched for.

According to the aspect of the invention, because the search for the access point is performed at the timing in accordance with the communication state of the direct wireless communication, the influence that the search for the access point exerts on the data communication through the direct wireless connection can be reduced, and the data communication through the direct wireless connection can be suitably performed.

Moreover, a function of each means that is set forth in claims is realized by a hardware resource of which a function is specified with a constitution itself, a hardware resource of which a function is specified by a program, or a combination of these. Furthermore, the function of each means is not limited to one that is realized with hardware resources that are physically independent of each other. Additionally, the present invention also materializes as a wireless communication program or a recording medium on which the wireless communication program is recorded. Of course, the recording medium may be a magnetic recording medium, be a magneto-optical medium, and be a recording medium that will be developed from now on.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the accompanying drawings. Moreover, constituent elements that correspond to one another in figures are given the same reference numeral and repetitive descriptions thereof are omitted.

1. Constitution of a Wireless Communication System

Figure 1:
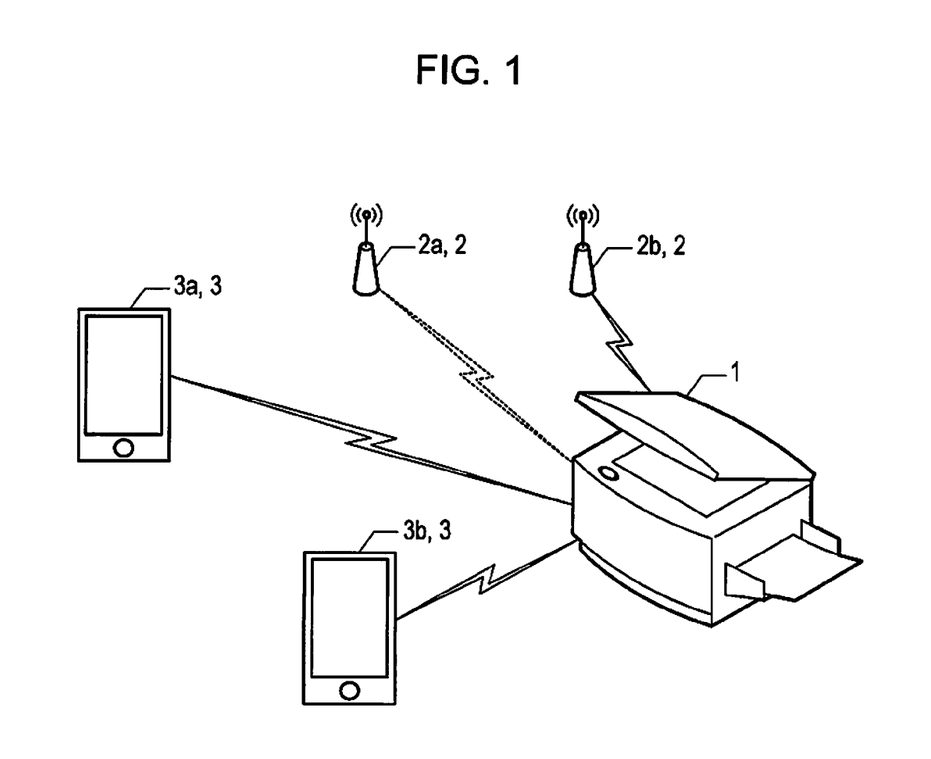
FIG. 1 is a diagram of a constitution of a wireless communication system according to the present embodiment.

FIG. 1 is a diagram illustrating a constitution of a wireless communication system according to the present embodiment.

FIG. 1 illustrates the wireless communication system that includes a printer 1 as one embodiment of a wireless communication apparatus, an access point 2, and a smartphone 3 as one embodiment of a wireless communication terminal. The access point 2 is a relay station that connects external apparatuses to each other with a wireless LAN protocol (IEEE 802.11). In the present embodiment, as an example, the wireless communication system in which connections to an access point 2a and an access point 2b are configured for the printer 1, and in which it is possible that the printer 1, a smartphone 3a, and the smartphone 3b are connected to one another without involving the access point 2 is described. However, the number of access points 2 that are connected to the printer 1 and the number of communication terminals that are connected to the printer 1 without involving the access point 2 are provided, as only examples, for specific description, and the number of each may be 1 or be three or more.

Figure 2:
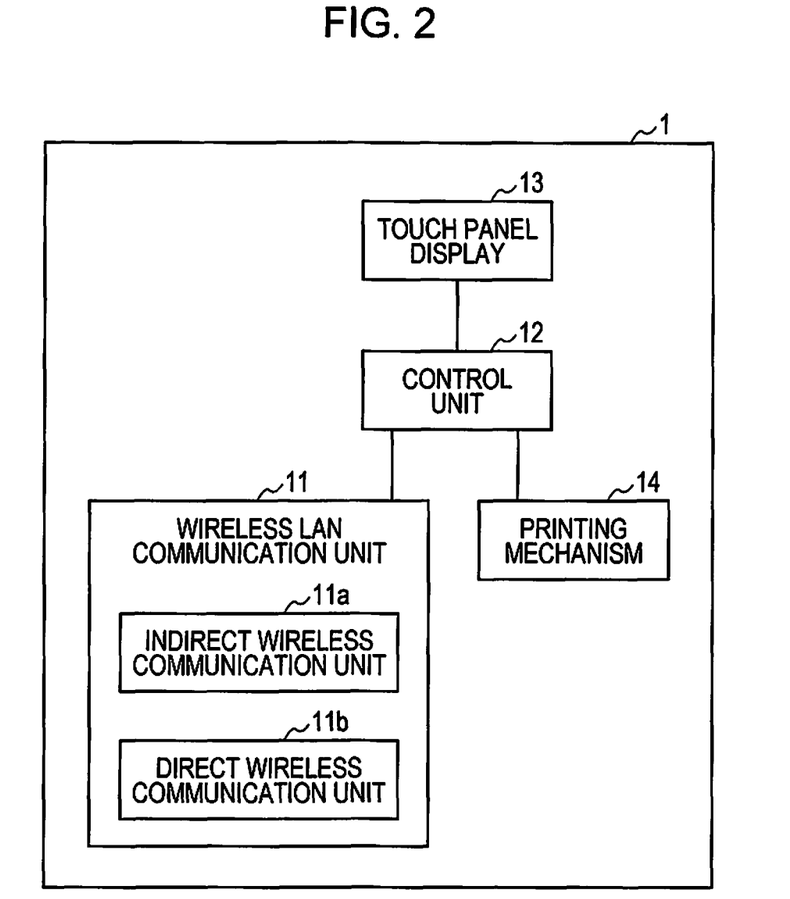
FIG. 2 is a block diagram illustrating a wireless communication apparatus according to the embodiment.

FIG. 2 is a block diagram illustrating the wireless communication apparatus according to the embodiment.

As illustrated in FIG. 2, the printer 1, as the wireless communication apparatus, includes a touch panel display 13, a control unit 12 that is constituted with a computer, a wireless LAN communication unit 11 for communicating with an external apparatus using the wireless LAN protocol, and a printing mechanism 14 that performs printing on a printing medium. The control unit 12 controls a search for the access point 2, which is performed by an indirect wireless communication unit 11a. The control unit 12 controls a timing at which the indirect wireless communication unit 11a searches for the access point 2, according to a communication state of a direct wireless communication. The control unit 12 includes a RAM that is a main storage device, a flash memory that is an external storage device, a processor, and an input and output mechanism. The control unit 12 reads a wireless communication program, which is stored in the flash memory, into the RAM, and executes the wireless communication program using the processor, thereby controlling the wireless LAN communication unit 11.

The wireless LAN communication unit 11 is a wireless LAN adapter equipped with only one antenna, and is controlled by the wireless communication program. The wireless LAN communication unit 11 has a function (indirect wireless communication) of making wireless connection to an external apparatus in an infrastructure mode through the access point 2, and a function (direct wireless communication) of making wireless connection to an external apparatus without involving the access point 2. That is, the wireless LAN communication unit 11 functions as the indirect wireless communication unit 11a and a direct wireless communication unit 11b. Moreover, various peer-to-peer communications, such as Wi-Fi (a registered trademark) Direct mode, autonomous Group Owner mode in compliance with Wi-Fi (a registered trademark) Direct specifications, and Bluetooth (a registered trademark), can be employed as the direct wireless communication. However, in the embodiment, it is assumed that the direct wireless communication is performed in the autonomous Group Owner mode in which the wireless LAN communication unit 11 (the direct wireless communication unit 11b) of the printer 1 functions as the access point.

The wireless LAN communication unit 11 described above performs the wireless communication using 13 channels CH1 to CH13. Furthermore, it is possible that the wireless LAN communication unit 11 makes a connection to a plurality of communication terminals at the same time. However, one antenna is used in a shared manner in the indirect wireless communication unit 11a and the direct wireless communication unit 11b, and because of this, it is one channel that can be used at the same time in the indirect wireless communication and the direct wireless communication. For this reason, when performing the direct wireless communication using a certain channel, the wireless LAN communication unit 11 is able to perform the indirect wireless communication using the same channel as used in the direct wireless communication, but cannot perform the indirect wireless communication that uses a different channel than the direct wireless communication. Accordingly, due to the search for the access point 2 for the indirect wireless communication between the direct wireless communication and the indirect wireless communication that share the antenna, an influence can be reduced that is exerted on data communication through direct wireless connection.

The control unit 12 may change a periodicity length T (refer to FIG. 5) that is an interval for the search for the access point 2 that is periodically performed, according to the communication state of the direct wireless communication. Accordingly, for example, in a case where the direct wireless communication is performed that does not involve the access point 2, the periodicity length T for the search is changed in such a manner that it is longer, and thus the influence that the search for the access point 2 exerts on the data communication through the direct wireless connection can be reduced.

The control unit 12 may select whether or not the access point 2 is searched for, according to the communication state of the direct wireless communication. Accordingly, the influence that the search for the access point 2 exerts on the data communication through the direct wireless connection can be reduced not by searching for the access point 2 in a case where communication for the direct wireless communication is performed and by performing the search for the access point 2 in a case where the communication for the direct wireless communication is not performed.

The control unit 12 may change a timing at which the search for the access point 2 is performed, according to an amount of communication in the direct wireless communication. Accordingly, according to the amount of communication in the direct wireless communication, the influence that the search for the access point 2 exerts on the data communication through the direct wireless connection can be efficiently reduced.

The control unit 12 may change the timing at which the search for the access point 2 is performed, according to the number of terminals that make connections through the direct wireless communication. Accordingly, according to the number of terminals that make connections through the direct wireless communication, the influence that the search for the access point 2 exerts on the data communication through the direct wireless connection can be efficiently reduced.

When the wireless connection to the access point 2 is configured, but the wireless connection to the access point 2 is not made, the control unit 12 may cause the indirect wireless communication unit 11a to search for the access point 2. Accordingly, due to the search for the access point 2, which is performed when the wireless connection to the access point 2 is configured, but the wireless connection to the access point 2 is not made, the influence that is exerted on the data communication through the direct wireless connection can be reduced.

Figure 3:
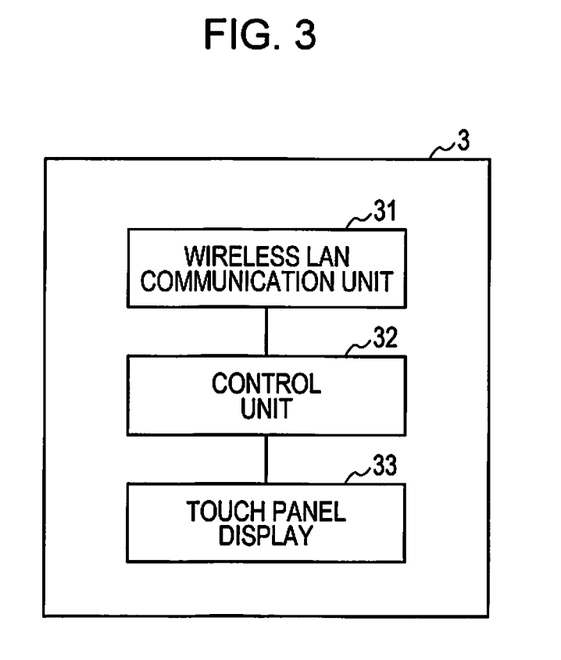
FIG. 3 is a block diagram illustrating the wireless communication terminal according to the embodiment.

FIG. 3 is a block diagram illustrating the wireless communication terminal according the embodiment.

As illustrated in FIG. 3, the wireless communication terminal, as the smartphone 3, includes a wireless LAN communication unit 31 for communicating with an external apparatus using the wireless LAN protocol, a control unit 32 that is constituted with a computer, and a touch panel display 33. The control unit 32 includes a RAM that is a main storage device, a flash memory that is an external storage device, a processor, and an input and output mechanism. The control unit 32 loads a wireless communication program, which is stored in the flash memory, into the RAM, and executes the wireless communication program using the processor, thereby controlling the wireless LAN communication unit 31. The wireless LAN communication unit 31 is controlled by the wireless communication program, and has a function of making a wireless connection to an external apparatus through the access point 2. Moreover, regardless of whether or not the wireless LAN communication unit 31 has the function of making a wireless connection to an external apparatus without involving the access point 2, in a case where the printer 1 functions as an access point, the smartphone 3 can perform the direct wireless communication with the printer 1 without involving the access point 2.

According to the embodiment, because the search for the access point 2 is performed at a timing in accordance with the communication state of the direct wireless communication, the influence that the search for the access point 2 exerts on the data communication through the direct wireless connection can be reduced, and the data communication through the direct wireless connection can be suitably performed.

2. Wireless Communication Method (First Embodiment)

Next, a first embodiment of wireless connection processing, as a wireless communication method, which is performed by the printer 1 described above is described with reference to FIGS. 4 to 6.

Figure 4:
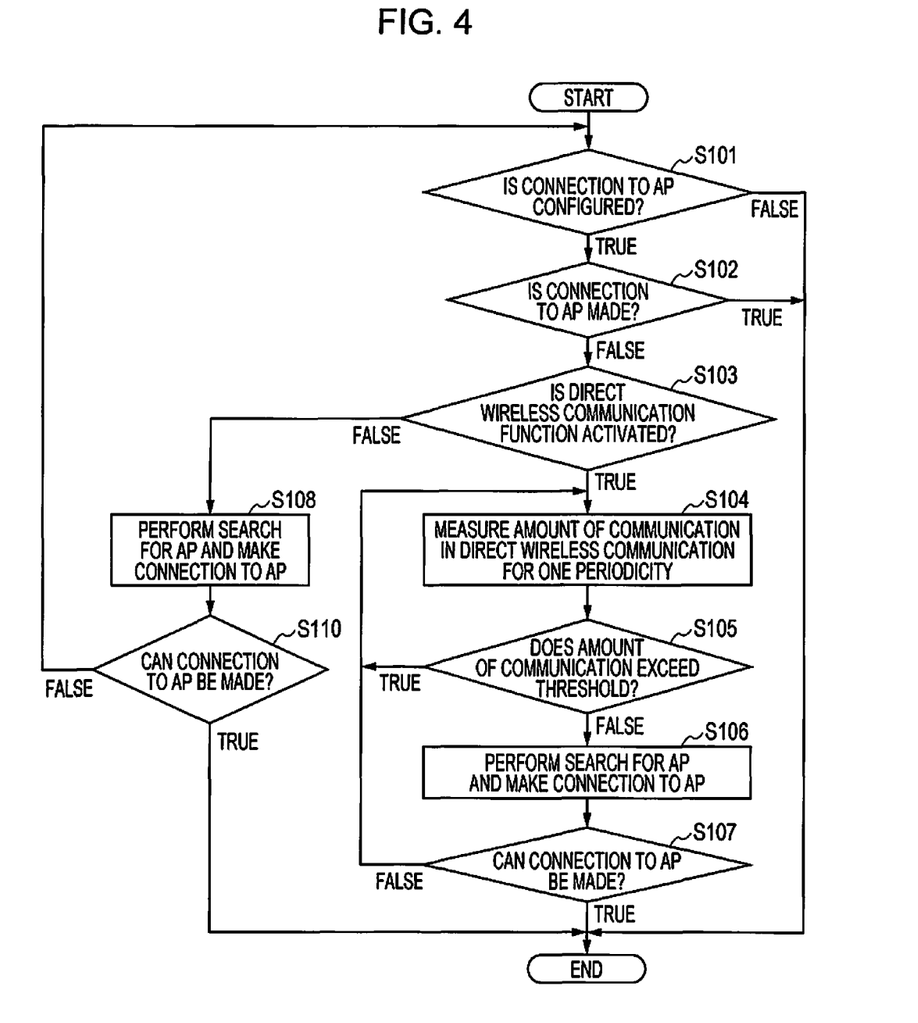
FIG. 4 is a flowchart illustrating wireless connection processing according to the embodiment.
Figure 5:
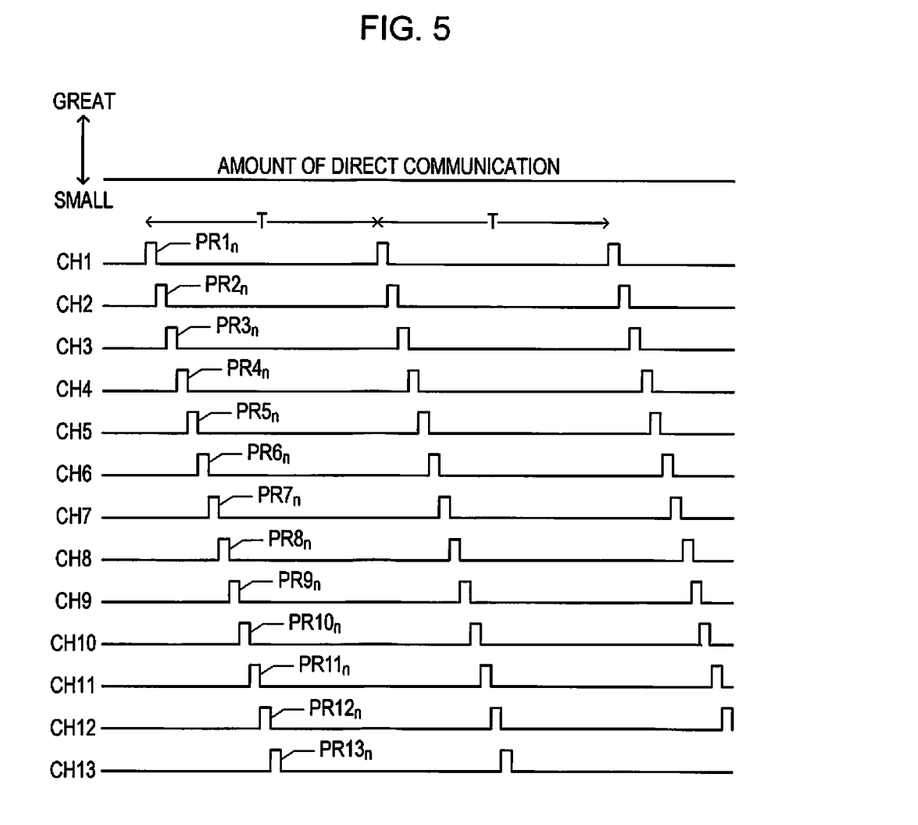
FIG. 5 is a timing chart illustrating the wireless connection processing according to the embodiment.
Figure 6:
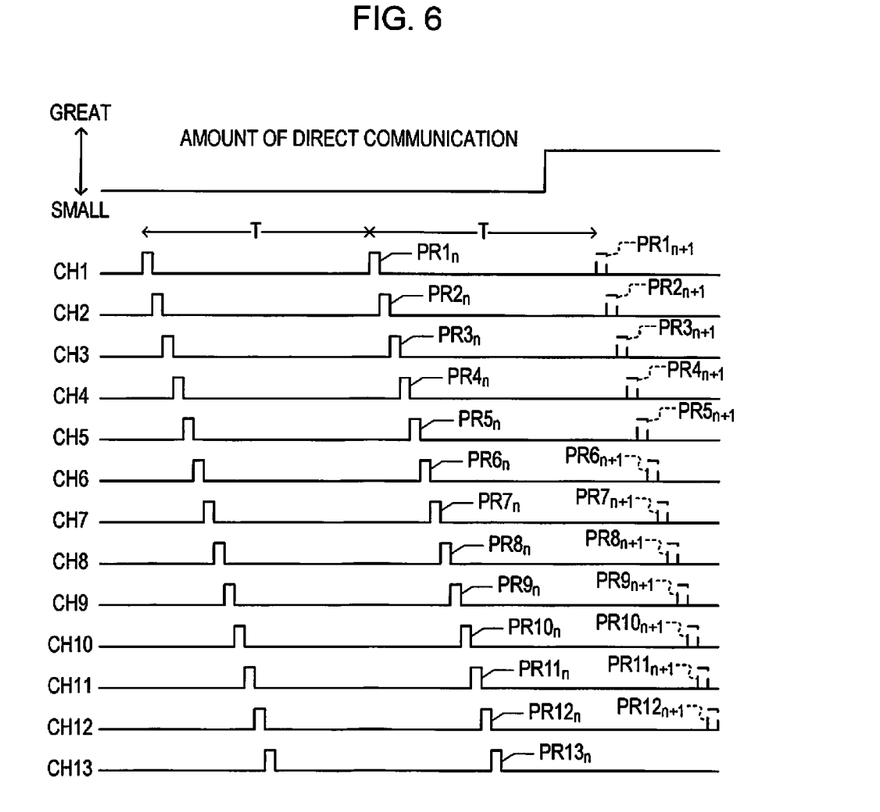
FIG. 6 is a timing chart illustrating the wireless connection processing according to the embodiment.

FIG. 4 is a flowchart illustrating wireless connection processing according to the embodiment. FIGS. 5 and 6 are timing charts illustrating the wireless connection processing according to the embodiment. A wireless connection processing sequence that is illustrated in FIG. 4 may be activated according to a user's instruction that is issued to the printer 1.

Firstly, in Step S101, the control unit 12 determines whether or not a connection to an external access point (AP) 2 is configured. If a SSID and a password are stored by the control unit 12, it is determined that connections to one or more access points 2 are configured. If not so, it is determined that the connections are not configured. In a case where the connections to one or more access points 2 are not configured (FALSE in Step S101), because there is no need to search for the access point 2, the control unit 12 ends the wireless connection processing.

In a case where the connections to one or more access points 2 are configured (TRUE in Step S101), in Step 102, the control unit 12 determines whether or not a connection is made to any one of the access points 2, the connections to which are configured. In a case where the connection is made to any one of access points 2, the connections to which are configured (TRUE in Step S102), because there is no need to search for the access point 2, the wireless connection processing is ended.

At this point, for example, although a connection to a certain access point 2 is configured for the printer 1, in a case where the access point 2 is actually not present within a range of reach of an electric wave from the printer 1, or in a case where the access point 2 is not powered on, a situation occurs in which the printer 1 cannot make a connection to the access point 2. In a case where the connection is not made to any one of the access points 2, the connection to which are configured (FALSE in Step S102), in Step S103, the control unit 12 determines whether or not a direct wireless communication function is activated that does not involve the access point. Specifically, the control unit 12 determines whether or not the printer 1 activates the function of making a connection, in a direct wireless communication mode.

In a case where the direct wireless communication function is not activated that does not involve the access point 2 (FALSE in Step S103), in Step S108, the control unit 12 repeats the search for the access point 2 (dynamic scan), and processing that makes a connection to the access point 2 that is found as a result of the search that uses the dynamic scan, with a fixed periodicity.

Specifically, as illustrated in FIG. 5, the control unit 12 sequentially changes the channels CH1 to CH13 one by one, and transmits probe requests $PR1_n$ to $PR13_n$ to the wireless LAN communication unit 11 one time in each of CH1 to CH13. When receiving the probe requests $PR1_n$ to $PR13_n$, the access point 2 transmits a probe response. The probe response is a packet that includes a SSID of each access point 2. When the wireless LAN communication unit 11 receives the probe response, the control unit 12 collates a SSID that is included in the probe response and a SSID that is configured for connection. In a case where the two SSIDs are consistent with each other, the control unit 12 makes a connection to the access point 2 using a password that is configured for connection. In a case where the wireless LAN communication unit 11 does not receive the probe response, and in a case where the SSID that is included in the probe response and the SSID that is configured for connection are not consistent with each other, processing for the connection to the access point 2 is not performed.

Next, in Step S110, the control unit 12 determines whether or not the connection can be made to any one of the access points 2, the connections to which are configured, through the use of the dynamic scan described above. In a case where the connection can be made to any one of the access points 2 (TRUE in Step S110), the wireless connection processing is ended. In a case where the connection cannot be made to the access point 2 (FALSE in Step S101), returning to S110 takes place after a prescribed time elapses.

On the other hand, in a case where the direct wireless communication function is activated that does not involve the access point 2 (TRUE in Step S103), in Step S104, the control unit 12 measures an amount of communication in the direct wireless communication that does not involve the access point 2 is determined in advance, for the periodicity length T that is predetermined in advance. The periodicity length T here may be the same as or different from a periodicity length that waits in Step S108. Moreover, the control unit 12 specifies a measuring start and a measuring end of the periodicity length T, and thus can acquire the amount of communication (an amount of data) from the wireless LAN communication unit 11.

Next, in Step S105, the control unit 12 determines whether or not the amount of communication in the direct wireless communication that does not involve the access point 2 exceeds a threshold that is determined in advance. When it comes to the threshold here, for example, a configuration may be employed so that, in a case where continuous communication is performed in such a manner that printing data is received, the threshold is exceeded and in a case where only timeout notification for preventing automatic disconnection due to timeout is performed, the threshold is not exceeded.

In a case where the amount of communication in the direct wireless communication that does not involve the access point 2 does not exceed the threshold (FALSE in Step S105) that is predetermined in advance, in Step S106, the control unit 12 performs the search for the access point 2 and makes the connection to the access point 2 that is found as a result of the search, in the same manner in Step S108, which is described above, and, in Step S107, determines whether or not the connection can be made to any one of the access points 2, the connections to which are configured. Then, in a case where the connection can be made to any one of the access points 2 (TRUE in Step S107), the wireless connection processing is ended. In a case where the connection cannot be made to any one of the access points 2 (FALSE in Step S107), returning to the processing in Step S104 takes place and the amount of communication in the direct wireless communication is measured for the next one periodicity.

In a case where the amount of communication in the direct wireless communication that does not involve the access point 2 exceeds the threshold that is determined in advance (TRUE in Step S105), the control unit 12 returns to the processing in Step S104 and measures the amount of communication in the direct wireless communication for the next one periodicity, without performing the search for the access point 2 and making the connection to the access point 2 that is found as a result of the search.

In this manner, with every periodicity that is predetermined in advance, when according to the amount of communication in the direct wireless communication, it is selected whether or not the access point 2 is searched for, in a case where the amount of communication in the direct wireless communication for each periodicity is at or below the threshold, the probe requests $PR1_n$ to $PR13_n$ are transmitted from the wireless LAN communication unit 11 at a timing that is illustrated in FIG. 5. That is, an interval at which the probe requests $PR1_n$ to $PR13_n$ are transmitted over each channel is fixed. On the other hand, in a case where transmission of the printing data from the smartphone 3a to the printer 1 starts, and so forth, and thus the amount of communication in the direct wireless communication changes for each periodicity and the threshold is exceeded, the probe requests $PR1_n$ to $PR13_n$ are transmitted from the wireless LAN communication unit 11, for example, at a timing that is illustrated in FIG. 6. Specifically, when the amount of communication in the direct wireless communication exceeds the threshold after the search for the access point 2 (the probe requests $PR1_n$ to $PR13_n$), the probe requests $PR1_{n+1}$ is not transmitted at a point in time at which the periodicity length T elapsed from the transmission of the probe request $PR1_n$. In the same manner, the probe requests $PR2_{n+1}$ to $PR13_{n+1}$ are also not transmitted at a point in time at which the periodicity length T elapsed from the transmission of the previous probe requests $PR2_n$ to $PR13_n$, over the channels CH2 to CH13.

For example, when transmitting the probe request in CH1, the wireless LAN communication unit 11 waits to receive the probe response to the probe request, and stands ready to transmit the next probe request only for a prescribed duration. In a case where the printer 1 performs the direct wireless communication to the smartphone 3 using CH1, the direct wireless communication between the printer 1 and the smartphone 3 that uses CH1 stops while the wireless LAN communication unit 11 transmits the probe request in CH1 and stands ready for the probe request. However, according to the embodiment described above, in a case where the printer 1 performs the direct wireless communication with the smartphone 3, in which the amount of communication exceeds the threshold, because the search is not performed in each of CH1 to CH13, the direct wireless communication between the printer 1 and the smartphone 3 is not delayed. Accordingly, the influence that the search for the access point 2 exerts on the data communication through the direct wireless connection can be reduced, and the data communication through the direct wireless connection can be suitably performed. On the other hand, in a case where the printer 1 does not perform the direct wireless communication with the smartphone 3, in which the amount of communication exceeds the threshold, because the probe request is transmitted in CH1 and the access point 2 is searched for, the printer 1 can make a connection to the access point 2. That is, according to the embodiment, when the direct wireless communication line is idle, the access point 2 can be efficiently searched for. In this way, because the search for the access point 2 is performed when the communication for the direct wireless communication is not performed, the search for the access point 2 does not exert the influence on the data communication through the direct wireless communication. For this reason, as in the embodiment, without interrupting the data communication through the direct wireless communication, the search (the dynamic scan) that uses the channels CH1 to CH13 can be performed and the data communication through the direct wireless connection can be suitably performed, although the configuration is employed so that when performing the direct wireless communication using a certain channel, the wireless LAN communication unit 11 is able to perform the indirect wireless connection using the same channel as used in the direct wireless communication, but cannot perform the indirect wireless communication that uses a different channel than the direct wireless communication.

3. Wireless Communication Method (Second Embodiment)

Next, a second embodiment of the wireless connection processing, as a wireless communication method, which is performed by the printer 1 described above is described with reference to FIG. 7.

Figure 7:
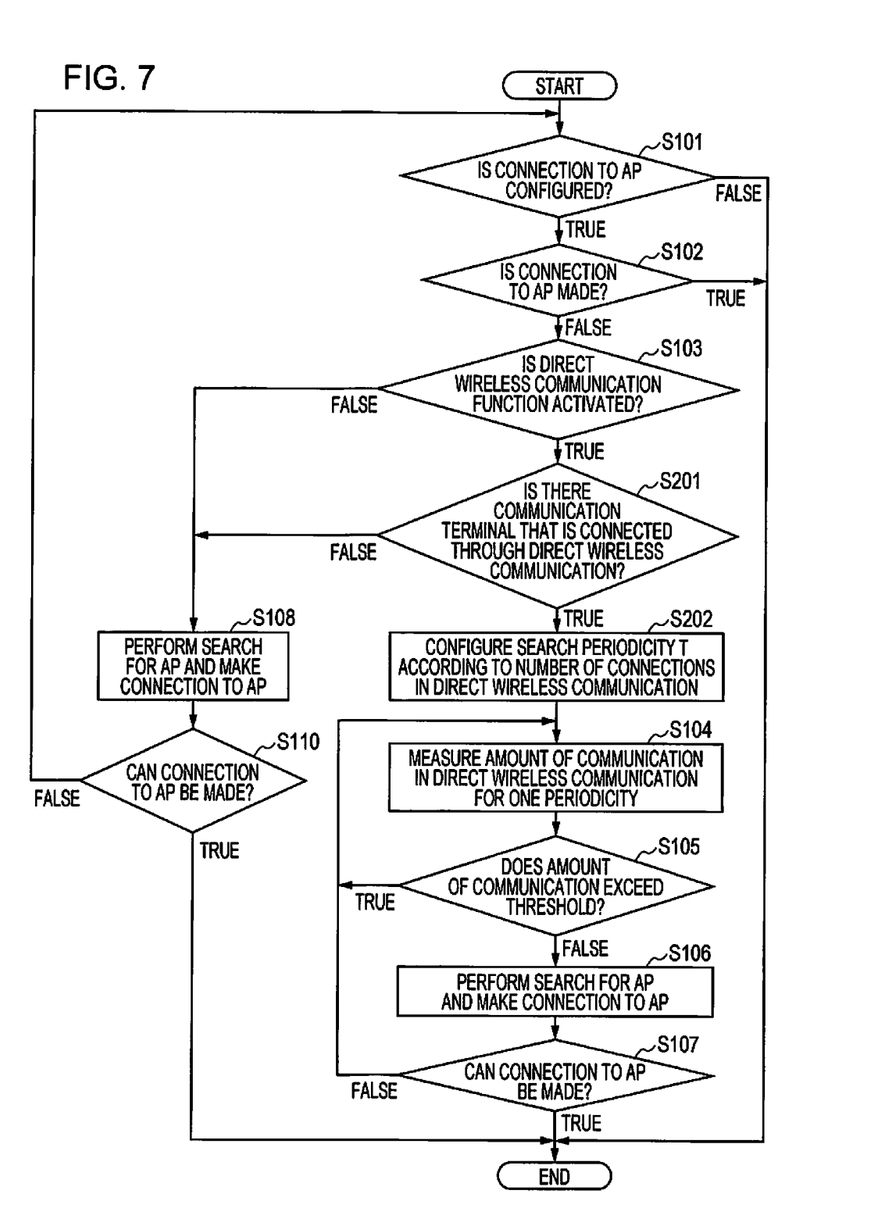
FIG. 7 is a flowchart illustrating the wireless connection processing according to the embodiment.

FIG. 7 is a flowchart illustrating wireless connection processing according to the embodiment. In the embodiment, a periodicity with which the access point 2 is repeatedly searched for is changed according to the number of communication terminals that are connected to the printer 1 without involving the access point 2. The details are as follows.

In a case where, in Step S103, which is described above, it is determined that the direct wireless communication is activated that does not involve the access point 2 (TRUE in Step S103), in Step S201, the control unit 12 determines whether or not the number of terminals that are connected through the direct wireless communication that does not involve the access point 2 is 1 or greater. In a case where the terminal that is connected through the direct wireless communication that does not involve the access point 2 is not present (FALSE in Step S201), in Steps S108 and S110, the control unit 12 makes a connection to the access point 2 that is found as a result of the search by performing the dynamic scan. In the case where the terminal that is connected through the direct wireless communication that does not involve the access point 2 is not, because the direct wireless communication through the use of the dynamic scan is not delayed, at this point, a configuration may be employed so that a periodicity length of the dynamic scan is shortened in such a manner that the time taken to make a connection to the access point 2 is shortened.

In a case where the number of terminals that are connected through the direct wireless communication that does not involve the access point 2 is 1 or greater (TRUE in Step S201), in Step S202, the control unit 12 configures the periodicity length T according to the number of terminals that are connected through the direct wireless communication. Specifically, as the number of terminals that are connected through the direct wireless communication increases, the control unit 12 configures the periodicity length T in such a manner that it becomes longer.

In this manner, processing operations from Step S104 to Step S107 are repeated after configuring the periodicity length T, in the same manner as in the first embodiment. Thus, as the number of terminals that are connected through the direct wireless communication becomes great, the time for continuing the direct wireless communication that does not involve the access point 2 can become longer by reducing the frequency with which the search for the access point 2 is performed. Furthermore, also in the embodiment, the amount of communication is measured with every one periodicity, and according to the amount of communication, it is selected wither or not the dynamic scan is performed for the periodicity. Because of this, although the number of terminals that are directly wirelessly connected is small, in a case where the actual amount of communication through the direct wireless connection is large, the direct wireless communication is not delayed. That is, according to the embodiment, when the direct wireless communication line is idle, the access point 2 can be efficiently searched for.

4. Wireless Communication Method (Third Embodiment)

Next, a third embodiment of the wireless connection processing, as a wireless communication method, which is performed by the printer 1 described above is described with reference to FIG. 8.

Figure 8:
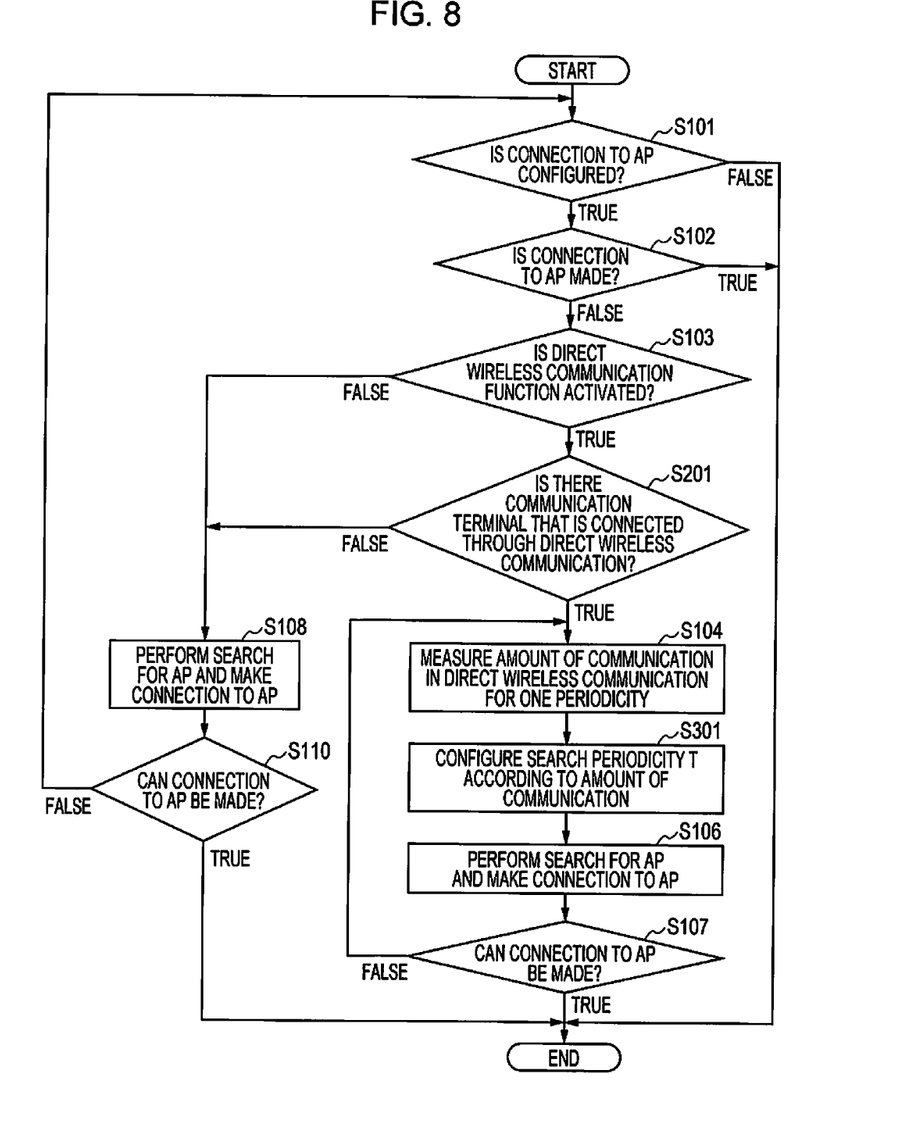
FIG. 8 is a flowchart illustrating the wireless connection processing according to the embodiment.

FIG. 8 is a flowchart illustrating wireless connection processing according to the embodiment. In the embodiment, when it comes to every periodicity, the periodicity with which the access point 2 is repeatedly searched for is changed for, according to the amount of communication in the direct wireless communication that does not involve the access point 2. The details are as follows.

In a case where the number of terminals that are connected through the direct wireless communication that does not involve the access point 2 is 1 or greater (in a case where a result of the determination is TRUE in Step S201 in the second embodiment), in Step S104, the control unit 12 measures the amount of communication in the direct wireless communication that does not involve the access point 2, in the same manner as in the first embodiment. In the embodiment, the periodicity length T for which the access point 2 is searched for is configured according to the amount of communication. However, a time length for which the amount of communication is measured may be changed according to the periodicity length T, and may be fixed regardless of the periodicity length T.

Next, in Step S301, the control unit 12 configures the periodicity length T according to the measured amount of communication. Specifically, as the amount of communication increases, the control unit 12 configures the periodicity length T in such a manner that it becomes longer. Then, the access point 2 is searched briefly over all channels (the probe requests are transmitted in 1 to 13 channels, respectively). In Step S106, the connection is made to the access point 2 that is found as a result of the search. In Step S107, it is determined whether or not the connection can be made to any one of the access points 2, the connection to which are configured. Then, in the case where the connection can be made to any one of the access points 2 (TRUE in Step S107), the wireless connection processing is ended. In a case where the access point 2 remains non-connected (FALSE in Step S107), returning to the processing in Step S104 takes place and the amount of communication in the direct wireless communication is measured for the next one periodicity. Furthermore, in Step S301, the periodicity with which the access point 2 is searched for is reconfigured.

Figure 9:
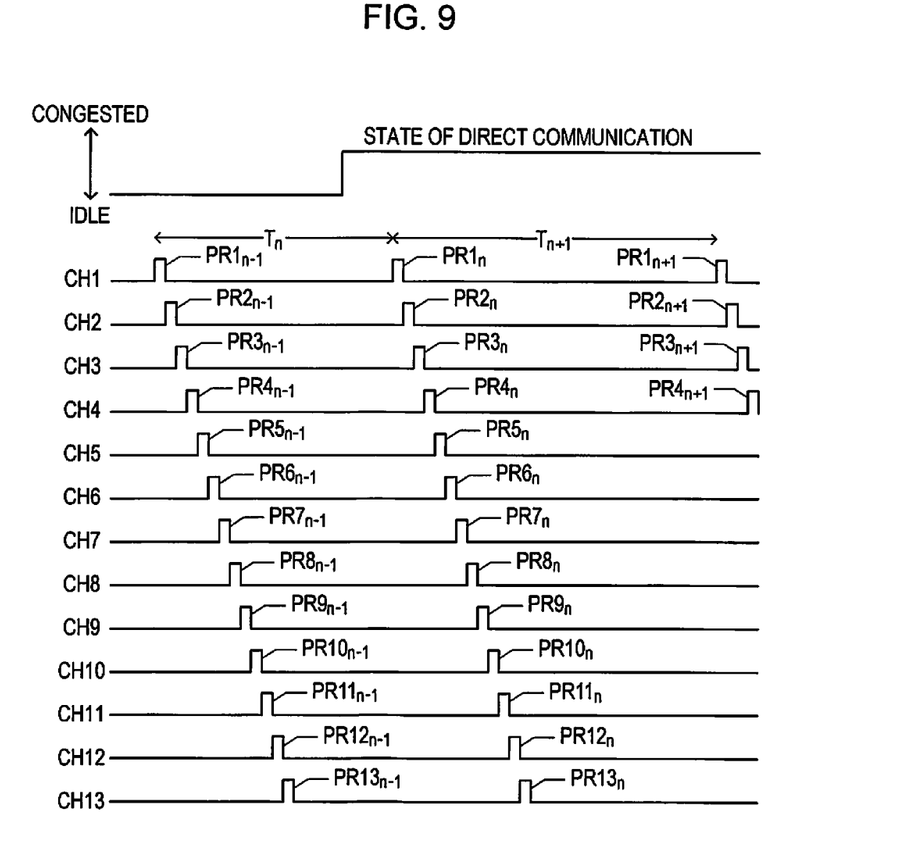
FIG. 9 is a timing chart illustrating the wireless connection processing according to the embodiment.
Figure 10:
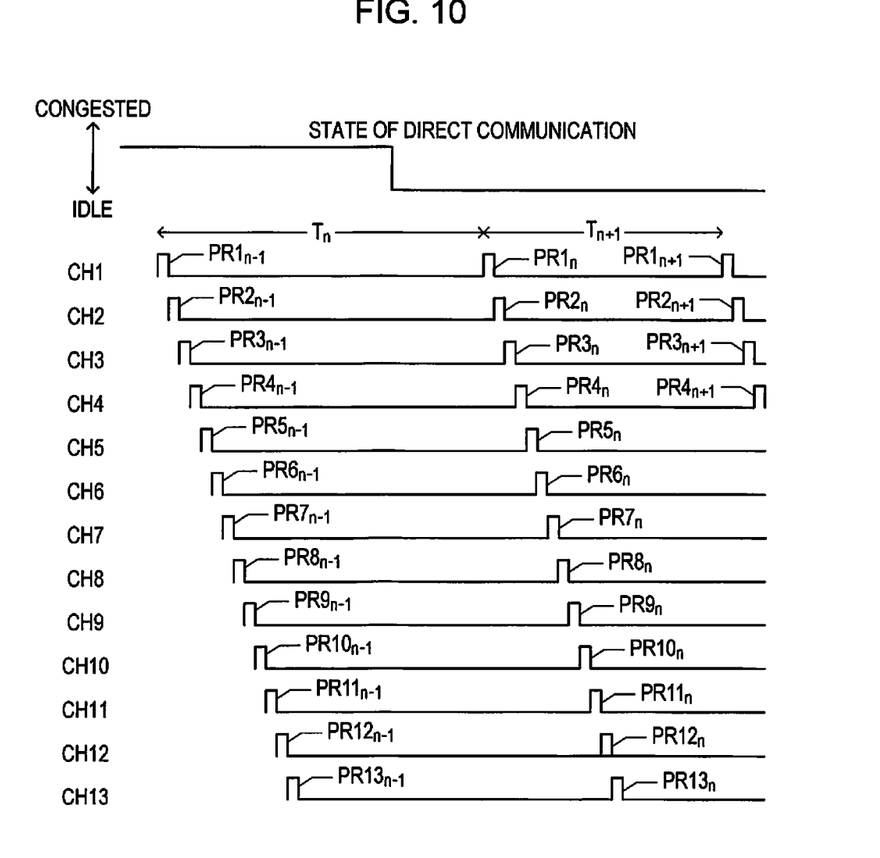
FIG. 10 is a timing chart illustrating the wireless connection processing according to the embodiment.

FIGS. 9 and 10 are timing charts illustrating wireless connection processing according to the embodiment.

In this manner, with every periodicity, when according to the amount of communication in the direct wireless communication, the periodicity with which the access point 2 is searched for is configured, when the amount of communication increases, the probe request is transmitted from the wireless LAN communication unit 11, for example, at a timing that is illustrated in FIG. 9. When the amount of communication in the direct wireless communication for a periodicity n increases more than for a previous (n−1)-th periodicity, a periodicity length $T_{n+1}$ from the probe request $PR1_n$ to the probe request $PR1_{n+1}$ that are configured according to the amount of communication for the periodicity n is longer than a periodicity length $T_n$ from the probe request $PR1_{n-1}$ to the probe request $PR1_n$ that are configured according to the amount of communication for the previous (n−1)-th periodicity. Conversely, when the amount of communication decreases, the probe request is transmitted from the wireless LAN communication unit 11, for example, at a timing that is illustrated in FIG. 10. When the amount of communication in the direct wireless communication for the periodicity n decreases more than for the previous (n−1)-th periodicity, the periodicity length $T_{n+1}$ from the probe request $PR1_n$ to the probe request $PR1_{n+1}$ that are configured according to the amount of communication for the periodicity n is shorter than the periodicity length $T_n$ from the probe request $PR1_{n-1}$ to the probe request $PR1_n$ that are configured according to the amount of communication for the previous (n−1)-th periodicity.

In this manner, according to the embodiment, because the periodicity with which the access point 2 is searched for is configured dynamically according the amount of communication in the direct wireless communication, when wireless communications line is idle, the access point 2 can be efficiently searched for and the influence that the search for the access point exerts on the direct wireless communication can be reduced.

5. Other Embodiments

Moreover, the technical scope of the invention is not limited to the embodiments described above, and, of course, various modifications can be made within the scope that does not depart from the gist of the invention. For example, in the embodiments described above, uniformly over all 13 channels, it is selected whether or not to perform the search for the access point, or a search periodicity is configured. However, by measuring the communication state for every channel, it may be selected whether or not to perform the search, and the search periodicity may be configured.

Furthermore, in the embodiments described above, the printer is provided as an example of the wireless communication apparatus, but it goes without saying that the invention can apply to various wireless communication apparatuses, each of which includes a wireless communication unit that has a function of making a wireless connection to an external apparatus through an access point and a function of making a wireless connection to an external apparatus without involving the access point, and that realizes these two functions using a shared antenna.

The entire disclosure of Japanese Patent Application No. 2016-044124, filed Mar. 8, 2016 and No. 2016-250618, filed Dec. 26, 2016 is expressly incorporated by reference herein.

What is claimed is:

1. A wireless communication apparatus comprising:
   an indirect wireless communication unit that performs wireless communication that involves an access point;
   a direct wireless communication unit that performs direct wireless communication to an external apparatus without through the access point; and
   a control unit that controls the indirect wireless communication unit to perform a search for the access point to be wirelessly connected to the indirect wireless communication unit,
   the control unit measuring an amount of communication in the direct wireless communication before performing the search, and controlling a timing of the search for the access point according to at least one of the amount of the communication in the direct wireless communication and the number of terminals that are connected through the direct wireless communication.

2. The wireless communication apparatus according to claim 1,
   wherein the control unit changes a periodicity length that is an interval at which the access point is periodically searched for, according to the at least one of the amount of the communication in the direct wireless communication and the number of terminals that are connected through the direct wireless communication.

3. The wireless communication apparatus according to claim 1,
   wherein the control unit selects whether or not to perform the search for the access point, according to a communication state of the direct wireless communication.

4. The wireless communication apparatus according to claim 1,
   wherein the control unit changes the timing of the search, according to the amount of communication in the direct wireless communication.

5. The wireless communication apparatus according to claim 1,
   wherein the control unit changes the timing of the search, according to the number of terminals that are connected through the direct wireless communication.

6. The wireless communication apparatus according to claim 1,
wherein, when wireless connection to the access point is configured, but the wireless connection to the access point is not made, the control unit causes the indirect wireless communication unit to preform the search for the access point.

7. The wireless communication apparatus according to claim 1,
wherein the indirect wireless communication unit and the direct wireless communication share an antenna that is used for wireless communication.

8. The wireless communication apparatus according to claim 1,
wherein the control unit changes a periodicity length that is an interval at which the access point is periodically searched for, according to the at least one of the amount of communication of the direct wireless communication and the number of terminals that are connected through the direct wireless communication.

9. A wireless communication method for use in a wireless communication apparatus including an indirect wireless communication unit that performs wireless communication that involves an access point and a direct wireless communication unit that performs direct wireless communication to an external apparatus without through the access point, the method comprising:
  measuring an amount of communication in the direct wireless communication; and
  controlling the indirect wireless communication unit to perform a search for the access point to be wirelessly connected to the indirect wireless communication unit,
  the measuring of the amount of communication in the direct wireless communication being performed before the performing of the search,
  the controlling including controlling a timing of the search for the access point, according to at least one of the amount of the communication in the direct wireless communication and the number of terminals that are connected through the direct wireless communication.

* * * * *